US011578998B2

(12) United States Patent
Ge et al.

(10) Patent No.: US 11,578,998 B2
(45) Date of Patent: Feb. 14, 2023

(54) ROTARY TRANSFORMER

(71) Applicant: GUANGDONG WELLING AUTO PARTS CO., LTD., Guangdong (CN)

(72) Inventors: Xiao Ge, Guangdong (CN); Jia Wan, Guangdong (CN)

(73) Assignee: GUANGDONG WELLING AUTO PARTS CO., LTD., Shunde Foshan (CN)

(*) Notice: Subject to any disclaimer, the term of this patent is extended or adjusted under 35 U.S.C. 154(b) by 153 days.

(21) Appl. No.: 17/119,186

(22) Filed: Dec. 11, 2020

(65) Prior Publication Data

US 2021/0096000 A1 Apr. 1, 2021

Related U.S. Application Data

(63) Continuation of application No. PCT/CN2019/093345, filed on Jun. 27, 2019.

(30) Foreign Application Priority Data

Jun. 29, 2018 (CN) .......................... 201810700480.0
Jun. 29, 2018 (CN) .......................... 201821022202.6

(51) Int. Cl.
*G01D 5/20* (2006.01)
*G01B 7/30* (2006.01)
(Continued)

(52) U.S. Cl.
CPC ................. *G01D 5/20* (2013.01); *G01B 7/30* (2013.01); *G01P 3/42* (2013.01); *H02K 1/16* (2013.01);
(Continued)

(58) Field of Classification Search
CPC .. H02K 11/215; H02K 21/021; H02K 21/022; H02K 21/024; H02K 2201/03
See application file for complete search history.

(56) References Cited

U.S. PATENT DOCUMENTS 2,866,913 A 12/1958 Kronacher
4,631,510 A 12/1986 Nagarkatti et al.
(Continued)

FOREIGN PATENT DOCUMENTS

CN 104184236 A 12/2014
CN 206250940 U 6/2017
(Continued)

OTHER PUBLICATIONS

Machine translation of DE 10 2012 007 444 A1, retreived from USPTO database.*
(Continued)

*Primary Examiner* — Ahmed Elnakib
*Assistant Examiner* — Minki Chang
(74) *Attorney, Agent, or Firm* — Scully Scott Murphy & Presser

(57) ABSTRACT

A rotary transformer is provided. The transformer has a stator and a rotor. The stator has a stator core and the rotor has a rotor core sleeved in the stator core. An air gap is defined between an inner side wall of the stator core and an outer side wall of the rotor core. During rotation of the rotor, a length S of the air gap along a circumferential direction of the transformer and a mechanical rotation angle θ of the rotor satisfy a sinusoidal function relationship containing third-harmonic components, and the length changes periodically according to the functional relationship to define a shape of the rotor core. As a result, the output signal amplitude and measurement accuracy of the position of the rotary transformer can be improved under the same maximum and minimum air gaps.

8 Claims, 3 Drawing Sheets

(51) Int. Cl.
   *G01P 3/42*    (2006.01)
   *H02K 1/16*    (2006.01)
   *H02K 3/12*    (2006.01)
   *H02K 24/00*   (2006.01)
(52) U.S. Cl.
   CPC ............... *H02K 3/12* (2013.01); *H02K 24/00* (2013.01); *H02K 2201/03* (2013.01)

(56) References Cited

U.S. PATENT DOCUMENTS

| | | | |
|---|---|---|---|
| 5,446,966 A | 9/1995 | Ishizaki | |
| 5,763,976 A | 6/1998 | Huard | |
| 7,646,194 B2* | 1/2010 | Makino | H02K 11/225 310/168 |
| 2005/0023921 A1* | 2/2005 | Kobayashi | H02K 24/00 310/168 |
| 2013/0020896 A1* | 1/2013 | Zhou | H02K 29/03 310/156.01 |
| 2017/0005549 A1 | 1/2017 | Ohira et al. | |

FOREIGN PATENT DOCUMENTS

| | | | | |
|---|---|---|---|---|
| CN | 208608878 U | | 3/2019 | |
| DE | 102012007444 A1 | * | 11/2012 | ............ H02K 24/00 |
| JP | 2008164435 A | | 7/2008 | |
| JP | 2012526969 A | | 11/2012 | |
| JP | 2013099161 A | | 5/2013 | |
| JP | 2018061416 A | | 4/2018 | |

OTHER PUBLICATIONS

Supplementary European Search Report dated Jul. 13, 2021 received in European Patent Application No. 19826357.6.
Office Action dated Jul. 18, 2022 received in European Patent Application No. EP 19 826 357.6.
Notice of Reasons for Refusal dated Jan. 11, 2022 received in Japanese Patent Application No. JP 2021-518842 together with an English language translation.
International Search Report dated Sep. 5, 2019 received in International Application No. PCT/CN2019/093345.

* cited by examiner

ROTARY TRANSFORMER

CROSS-REFERENCES TO RELATED APPLICATIONS

The present application is a continuation application of PCT International Application No. PCT/CN2019/093345, filed on Jun. 27, 2019, which claims priority to Chinese Patent Application No. 201810700480.0, entitled "ROTARY TRANSFORMER" as an invention, filed with the Chinese Patent Office on Jun. 29, 2018, and priority to Chinese Patent Application No. 201821022202.6, entitled "ROTATING TRANSFORMER" as a utility model, filed with the Chinese Patent Office on Jun. 29, 2018, which are incorporated herein by reference in their entirety for all purposes. No new matter has been introduced.

FIELD

The disclosure relates to the field of transformers, in particular to a rotary transformer.

BACKGROUND

A rotary transformer, also known as a synchronous resolver, is an electromagnetic sensor, which is used to measure a rotating shaft angular displacement and angular velocity of a rotating shaft of a rotating object and consists of a stator and a rotor. A stator winding is used as a primary edge of the transformer to receive excitation voltage, a rotor winding is used as a secondary edge of the transformer to obtain induction voltage through electromagnetic coupling. Since the primary edge and the secondary winding of the transformer change relative positions with an angular displacement of the rotor, a magnitude of the output voltage varies with the angular displacement of the rotor, and the magnitude of the voltage of the output winding is in sinusoidal and cosinoidal function relationship with the rotation angle of the rotor.

The salient pole rotary transformer is widely applied to occasions with high requirements on safety performance, such as automobile motors, due to simple manufacture, high stability and good temperature resistance. In the related art, as shown in FIG. 1, a salient pole rotor of a salient pole rotary transformer generally adopts a rotor profile with a sinusoidal distribution, but has the following defects.

The rotor error is large, and the position accuracy is not high.

SUMMARY

In order to solve at least one of the above technical problems, it is an object of the present disclosure to provide a rotary transformer.

In order to achieve the object, provided by the present disclosure is a rotary transformer, comprising: a stator including a stator core and an input winding and an output winding wound around the stator core, wherein a plurality of stator slots are opened on an inner side wall of the stator core, and the plurality of stator slots are distributed in a circumferential direction and respectively cause two ends of the stator core to be connected, so that stator teeth are formed between any adjacent two of the stator slots, to respectively wind the input winding and the output winding; and a rotor including a rotor core sleeved in the stator core, wherein an air gap is defined between the inner side wall of the stator core and an outer side wall of the rotor core, when the rotor rotates, a length $\delta$ of the air gap, along a circumferential direction, and a mechanical rotation angle $\theta$ of the rotor satisfy a sinusoidal function relationship containing third-harmonic components, and periodic changes are performed according to the functional relationship to define a shape of the rotor core.

Optionally, the rotary transformer is a magneto-resistive rotary transformer, an input winding and an output winding (including sinusoidal windings and cosinoidal windings) are wound on stator teeth of a stator core according to a specified way of winding, so that stator is excitated through the input winding, and variation potential signals are output through the output winding, the length $\delta$ of the air gap, along the circumferential direction, and a mechanical rotation angle $\theta$ of the rotor are set to satisfy a sinusoidal function relationship containing third-harmonic components so as to inject a third harmonic into the air gap of the rotary transformer so as to weaken the third harmonic of the output potential of the output end, so that the measurement error of the magneto-resistive rotary transformer can be reduced, and the measurement accuracy of the position of the rotary transformer can be improved.

Since the rotary transformer structurally ensures that a magnetic flux distribution in the air gap accords with a sinusoidal rule when the rotor rotates for one circle, the air gap magnetic field approximates to a sinusoidal shape by specially designing a shape of the rotor, and a third sinusoidal component is injected by improving the shape of the rotor. Compared with the sinusoidal shape in the prior art, a difference between the maximum air gap length and the minimum air gap length can be reduced by injecting the third sinusoidal component, and the same output potential can be achieved while a third harmonic interference is reduced in the measurement process.

According to the above description, a person skilled in the art can also understand that by adopting the rotor structure according to the present disclosure, in a case where difference between the maximum air gap length and the minimum air gap length is reduced, on the premise that the number of the stator teeth is unchanged and the number of winding turns is unchanged, the output potential is the same as the potential output by the rotor structure in the prior art. Therefore, when the rotor structure according to the present disclosure is adopted, the difference between the maximum air gap length and the minimum air gap length is not reduced, an object of improving the output potential can be achieved while the detection accuracy of the position of the rotor is improved, and therefore the operation efficiency of the rotary transformer can be improved.

In addition, in order to generate a large output signal, the transformer rotor in the prior art is implemented by increasing the difference between the maximum air gap and the minimum air gap, so that a variation rate of the external dimension of the rotor is large, and the requirement on the machining accuracy of the rotor is high. According to the rotor provided by the embodiment of the present disclosure, by injecting a third harmonic wave, the processing difficulty of the rotor can also be reduced.

In addition, the rotary transformer according to the embodiments of the present disclosure can also have the following additional technical features.

Optionally, the input winding comprises an excitation winding; the output winding comprises a sinusoidal winding and a cosinoidal winding, wherein two of the stator teeth are arranged between any adjacent two of the excitation windings at intervals to respectively wind the sinusoidal windings and the cosinoidal windings.

According to the embodiment, two of the stator teeth are arranged between any adjacent two of the excitation windings at intervals to respectively wind a sinusoidal winding and a cosinoidal winding, so that the excitation winding, the sinusoidal winding and the cosinoidal winding are distributed at intervals along the circumferential direction, the stator is excited by combining the excitation winding, and variation signals which form a special functional relationship with the mechanical rotation angle θ of the rotor are output by the sinusoidal windings and the cosinoidal windings, and the measurement accuracy of the position of the rotary transformer is improved when the third harmonic wave is injected into the air gap.

For example, the stator teeth include a first stator tooth for winding an excitation winding, a second stator tooth for winding a sinusoidal winding and a third stator tooth for winding a cosinoidal winding, wherein the second stator tooth and the third stator tooth are arranged between any adjacent two of the first stator teeth.

According to any of the above embodiments, optionally, a sinusoidal winding is wound on two sides of any one of adjacent two of the excitation windings, and a cosinoidal winding is wound on two sides of the other excitation winding.

Optionally, according to winding different windings, a plurality of circumferentially distributed stator teeth can be divided into a first stator tooth, a second stator tooth and a third stator tooth, the number of the first stator tooth, the number of the second stator tooth and the number of the third stator tooth are the same, so that an excitation winding for signal input and a sinusoidal winding and a cosinoidal winding for signal output are wound respectively, wherein adjacent first stator teeth, second stator teeth and third stator teeth are a group of winding teeth, and a plurality of circumferentially distributed stator teeth are composed of a plurality of groups of winding teeth, so that regular winding of the magneto-resistive rotary transformer is realized to achieve the purpose of improving measurement accuracy in combination with injection of a third sinusoidal component.

For example, the input winding and the output winding can be divided into a plurality of winding units which are connected end to end in the circumferential direction to complete winding, and in one winding unit, the winding unit sequentially comprises an excitation winding, a sinusoidal winding, a cosinoidal winding, an excitation winding, a cosinoidal winding and a sinusoidal winding in the counterclockwise direction or comprises an excitation winding, a cosinoidal winding, a sinusoidal winding, an excitation winding, a sinusoidal winding and a cosinoidal winding in the counterclockwise direction.

According to any of the above embodiments, optionally, the length δ of the air gap satisfies both the first sinusoidal component distribution and the third sinusoidal component distribution of the mechanical rotation angle θ of the rotor, i.e. δ=f(cos(pθ), cos(3pθ)), where p is the number of pairs of poles of the rotor of the rotary transformer.

Optionally, a first sinusoidal component distribution and a third sinusoidal component distribution of the mechanical rotation angle θ are simultaneously satisfied by defining a length δ of the air gap, i.e. δ=f(cos(pθ), cos(3pθ)). When an output potential of a sinusoidal winding of the rotary transformer is equal to an amplitude value of a first fundamental wave of an output potential of a cosinoidal winding, detection accuracy of the position of the rotor is improved by injecting the third sinusoidal component of the length of the air gap.

According to any of the above embodiments, optionally, the number of coil turns of the excitation winding on each first stator tooth is the same; the number of coil turns of a sinusoidal winding is the same as that of a cosinoidal winding.

Optionally, the number of coil turns of the excitation winding on each first stator tooth is limited to be the same to generate the stator excitation evenly, so as to rotate the rotor evenly; the number of coil turns of the sinusoidal winding and the number of coil turns of the cosinoidal winding are limited to be the same, so that the output potential of the sinusoidal winding and the output potential of the cosinoidal winding are only different in phase, and the accurate measurement of the rotating shaft angular displacement and the angular velocity of the rotating shaft is guaranteed.

According to any of the above embodiments, optionally, the length δ of the air gap and the mechanical angle θ of the rotor also satisfy the following equation:

$$\delta = \frac{K\delta_{min}}{1 + (K-1)\cos(p\theta) - k\cos(3p\theta)}$$

wherein $\delta_{min}$ is the minimum length of the air gap, K is a first sinusoidal component coefficient, and k is a third sinusoidal component coefficient, $1<K<2$, $0<k<(K-1)$.

Optionally, the length of the air gap is changed with the change of the mechanical angle by defining a specific relationship formula, and the profile of the rotor injected with the third sinusoidal component is obtained by adjusting the first sinusoidal component coefficient K and the third sinusoidal component coefficient k, so as to improve the measurement accuracy of the rotation angle.

According to any of the above embodiments, optionally, $\delta_{min}=0.72$ mm, K=1.9, k=0.09, and p=2.

Optionally, an explicit functional relationship between the length δ of the air gap and the mechanical angle θ of the rotor is obtained by defining $\delta_{min}=0.72$ mm, K=1.9, k=0.09, and p=2 to facilitate implementation.

According to an embodiment, P=2, the number of the stator teeth is 24, i.e. a salient pole rotary transformer with 4 poles and 24 slots, wherein an excitation winding, a sinusoidal winding and a cosinoidal winding are respectively and sequentially arranged on three adjacent teeth, coils of the three teeth are arranged in an array of 8 along the circumference, each having 25 coil turns; a wire diameter φ1 is 0.1 mm, the sinusoidal winding and the cosinoidal winding each has 55 coil turns, the wire diameter φ2 is 0.13 mm, silicon steel sheets of DW310-35 are selected as punching sheets of the rotary transformer, and according to a solution setup in the prior art, the length of the maximum air gap is $\delta_{max}=13.68$ mm, and the minimum length of the air gap is $\delta_{min}=0.72$ mm, and the decoded rotor electrical angle error of the rotary transformer is e1=±1.05°.

According to the rotor profile of the present disclosure, the length of the maximum air gap of the rotary transformer is $\delta_{max}=7.2$ mm, the minimum length of the air gap is $\delta_{min}=0.76$ mm, and the rotor electrical angle error after the rotary transformer is decoded is e1=±0.04°. That is, the decoded rotor electrical angle error of the salient-pole rotary transformer of the rotor profile injected with the third sinusoidal component is 3.81% of the decoded rotor electrical angle error of the salient-pole rotary transformer of the sinusoidal rotor profile in the prior art, thereby realizing the reduction of the rotor error.

TABLE 1

| θ(°) | δ1(mm) Prior art | δ2(mm) Examples of the present disclosure |
|---|---|---|
| 0 | 0.720 | 0.756 |
| 15 | 0.769 | 0.769 |
| 30 | 0.943 | 0.888 |
| 45 | 1.368 | 1.368 |
| 60 | 2.487 | 2.974 |
| 75 | 6.202 | 6.202 |
| 90 | 13.680 | 7.200 |
| 105 | 6.202 | 6.202 |
| 120 | 2.487 | 2.974 |
| 135 | 1.368 | 1.368 |
| 150 | 0.943 | 0.888 |
| 165 | 0.769 | 0.769 |
| 180 | 0.720 | 0.756 |
| 195 | 0.769 | 0.769 |
| 210 | 0.943 | 0.888 |
| 225 | 1.368 | 1.368 |
| 240 | 2.487 | 2.974 |
| 255 | 6.202 | 6.202 |
| 270 | 13.680 | 7.200 |
| 285 | 6.202 | 6.202 |
| 300 | 2.487 | 2.974 |
| 315 | 1.368 | 1.368 |
| 330 | 0.943 | 0.888 |
| 345 | 0.769 | 0.769 |
| 360 | 0.720 | 0.756 |

As can be seen from Table 1, in the case where a size of the stator is the same as that in the prior art, the difference between the maximum air gap length and the minimum air gap length is reduced, the output potential of the sinusoidal winding of the rotary transformer is equal to the primary fundamental amplitude value of the output potential of the cosinoidal winding, but the detection accuracy of the position of the rotor is improved.

In addition, by adjusting an inner diameter of a stator core, a difference between the maximum air gap length and the minimum air gap length can be the same as that in the prior art, the output potential amplitude can be improved without increasing the number of coil turns of an output winding, and meanwhile the detection accuracy of the position of the rotor is improved.

According to any of the above embodiments, optionally, the rotor core is constructed in a salient pole structure according to the number of pairs of poles of the rotor, so that the length δ of the air gap varies with the mechanical rotation angle θ in a circumferential direction.

Optionally, a limiting groove is formed in the inner side wall of the shaft hole of the rotor core; and a limiting rib matched with the limiting groove is arranged on the outer side wall of the rotating shaft.

According to any of the above embodiments, optionally, the number of the stator teeth is an integer multiple of 12.

Optionally, the stator core is formed by stacking a plurality of silicon steel sheets along an axial direction of a rotating shaft; the rotor core is formed by stacking a plurality of silicon steel sheets along an axial direction of the rotating shaft. Two end faces of the rotor core respectively protrude out of two end faces of the stator core along an axial direction.

The device of the present disclosure has at least the following technical effects or advantages: the length δ of the air gap, along the circumferential direction, and a mechanical rotation angle θ of the rotor are set to satisfy a sinusoidal function relationship containing third-harmonic components so as to inject a third harmonic into the air gap of the rotary transformer so as to weaken the third harmonic of the output potential of the output end, so that the measurement error of the magneto-resistive rotary transformer can be reduced, and the measurement accuracy of the position of the rotary transformer can be improved.

Additional aspects and advantages of the present disclosure will be apparent from the description which follows, or may be learned by practice of the present disclosure.

BRIEF DESCRIPTION OF THE DRAWINGS

The foregoing and/or additional aspects and advantages of the present disclosure will be apparent from and elucidated with reference to the embodiments described hereinafter with reference to the accompanying drawings, in which.

Figure 1:
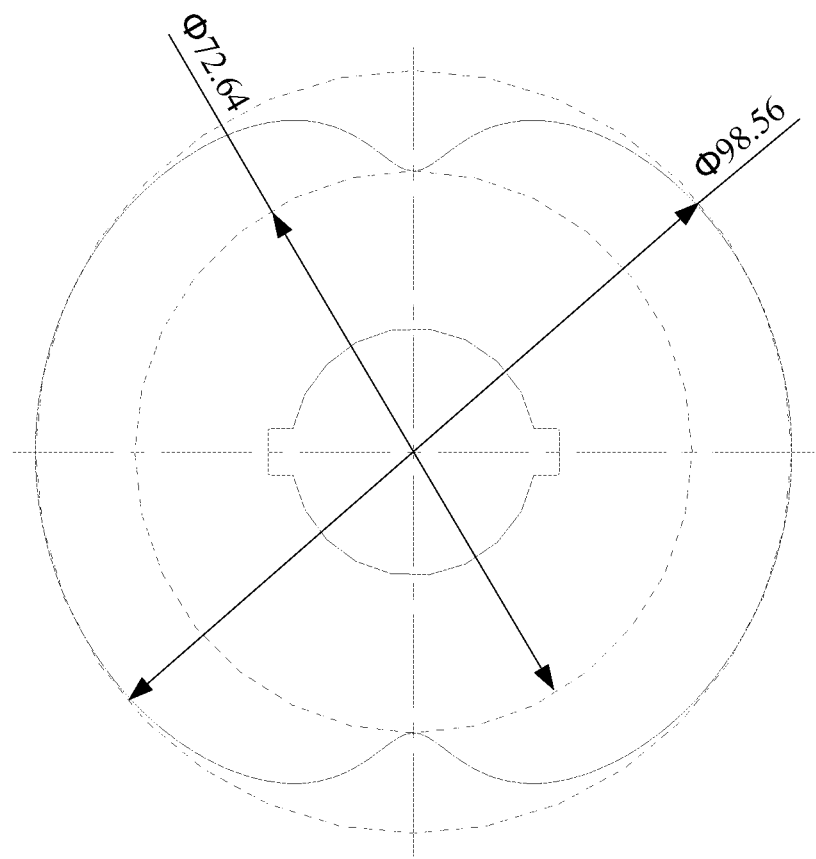
FIG. 1 is a schematic view showing a cross-sectional structure of a rotor of a rotary transformer in a related art.

The following is description of the reference numerals of the figures:

1 rotary transformer, 10 stator, 102 stator core, 104 excitation winding, 106 sinusoidal winding, 108 cosinoidal winding, and 20 rotor.

DETAILED DESCRIPTION OF THE EMBODIMENTS

In order that the above objects, features and advantages of the present disclosure may be more clearly understood, the present disclosure is described in further detail below with reference to the accompanying drawings and detailed description. It should be noted that the embodiments and features in the embodiments of the present disclosure may be combined with one another without conflict.

In the following description, numerous specific details are set forth in order to provide a thorough understanding of the present disclosure, but the present disclosure may be practiced otherwise than as described herein, and therefore, the scope of the present disclosure is not limited to the particular embodiments disclosed below.

A rotary transformer according to some embodiments of the present disclosure is described below with reference to FIGS. 2 and 3.

Figure 2:
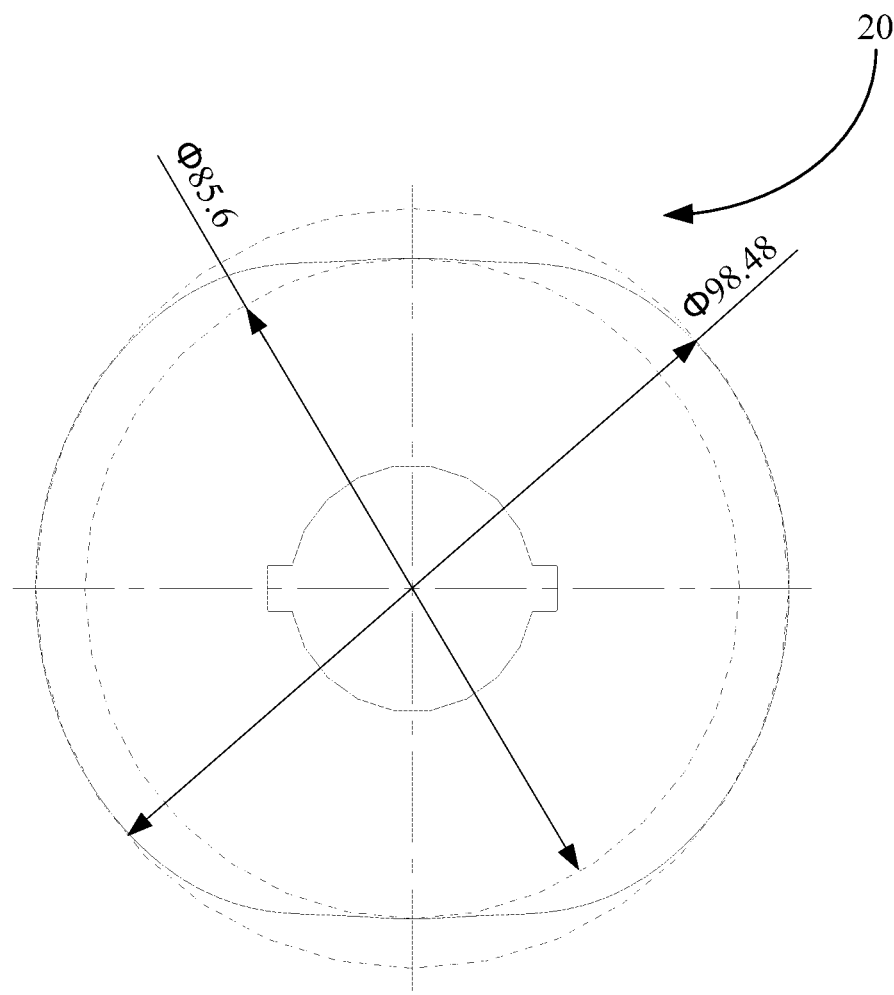
FIG. 2 shows a schematic cross-sectional view of a rotor of a rotary transformer according to one embodiment of the present disclosure.
Figure 3:
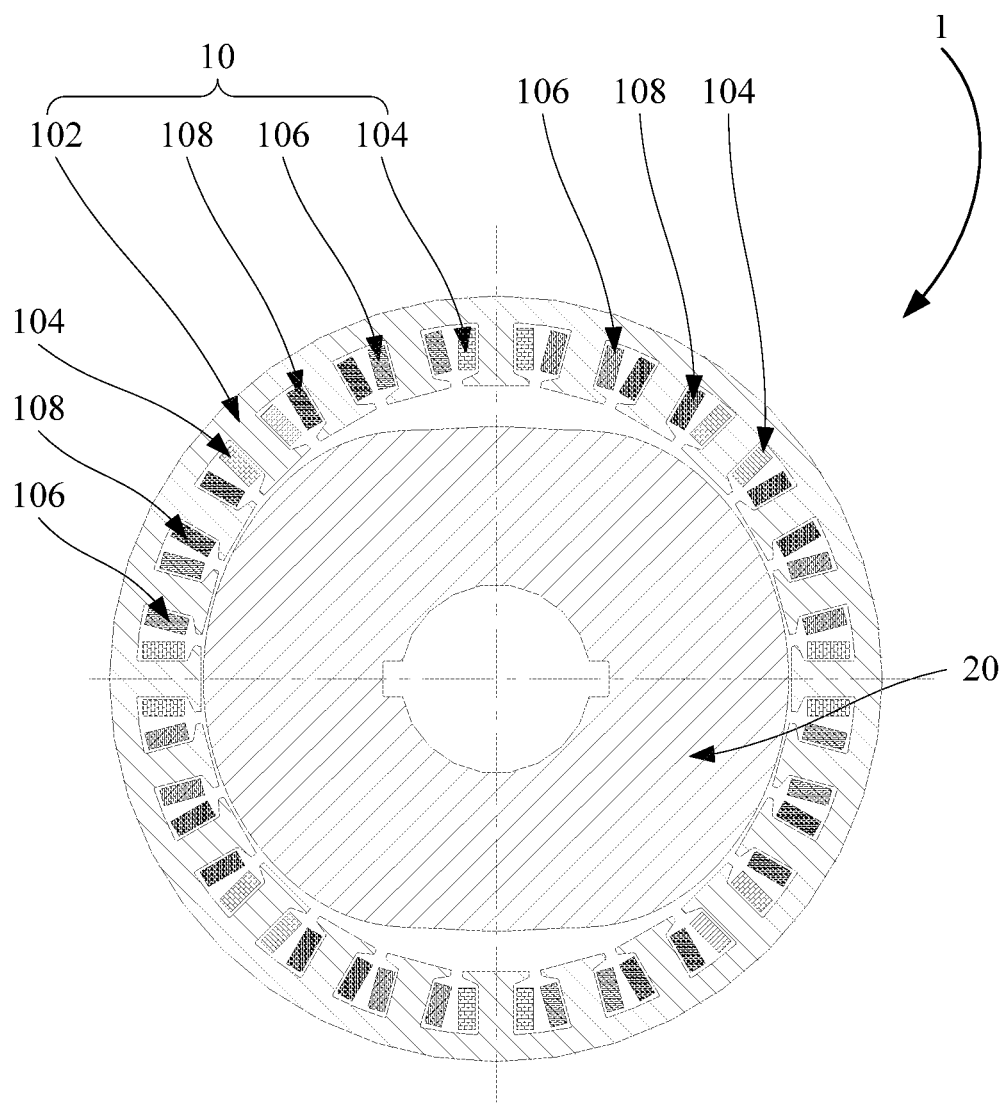
FIG. 3 shows a schematic diagram of a structure of a rotary transformer according to one embodiment of the present disclosure.

As shown in FIGS. 2 and 3, a rotary transformer 1 according to an embodiment of the present disclosure includes a stator 10, which includes a stator core 102 and an input winding and an output winding wound around the stator core 102. A plurality of stator slots are opened on or provided in an inner side wall of the stator core 102, and the plurality of stator slots are distributed in a circumferential direction of the stator 10 or the rotary transformer 1 and respectively cause two ends of the stator core 102 to be communicatable, so that stator 10 teeth are formed between any adjacent two of the stator slots, to respectively wind the input winding and the output winding. The rotary transformer further includes a rotor 20, which includes a rotor core sleeved in the stator core. An air gap is defined between the inner side wall of the stator core 102 and the outer side wall of the rotor core. When the rotor 20 rotates, a length δ of the air gap, along a circumferential direction, and a mechanical rotation angle θ of the rotor 20 satisfy a sinusoidal function relationship containing third-harmonic components, and periodic changes are performed to the length according to the functional relationship to define a shape of the rotor core.

According to the embodiment, the rotary transformer 1 is a magneto-resistive rotary transformer, an input winding (including an excitation winding 104) and an output winding (including sinusoidal windings 106 and cosinoidal windings 108) are wound on stator teeth of the stator core 102 according to a specified way of winding, so that stator 10 is excited through the excitation winding 104, and variation signals which form a special functional relationship with the mechanical rotation angle $\theta$ of the rotor 20 are output by the sinusoidal windings 106 and the cosinoidal windings 108. The length $\delta$ of the air gap, along the circumferential direction, and a mechanical rotation angle $\theta$ of the rotor are set to satisfy a sinusoidal function relationship containing third-harmonic components so as to inject a third harmonic into the air gap of the rotary transformer so as to weaken the third harmonic of the output potential of the output end, so that the measurement error of the magneto-resistive rotary transformer can be reduced, and the measurement accuracy of the position of the rotary transformer can be improved.

Since the rotary transformer structurally ensures that a magnetic flux distribution in the air gap accords with a sinusoidal rule when the rotor 20 rotates for one circle, the air gap magnetic field approximates to a sinusoidal shape by specially designing a shape of the rotor 20, and a third sinusoidal component is injected by improving the shape of the rotor 20. Compared with the sinusoidal shape in the prior art, a difference between the maximum air gap length and the minimum air gap length can be reduced by injecting the third sinusoidal component, and the same output potential can be achieved while a third harmonic interference is reduced in the measurement process.

According to an embodiment, as shown in FIG. 2, in a case where difference between the maximum air gap length and the minimum air gap length is reduced, on the premise that the number of the stator teeth is unchanged and the number of winding turns is unchanged, the output potential is the same as the potential output by the rotor structure in the prior art, as shown in FIG. 1. Therefore, when the rotor structure according to the present disclosure is adopted, the difference between the maximum air gap length and the minimum air gap length is not reduced, an object of improving the output potential can be achieved while the detection accuracy of the position of the rotor 20 is improved, and therefore the operation efficiency of the rotary transformer can be improved.

In addition, in order to generate a large output signal, the transformer rotor 20 in the prior art is implemented by increasing the difference between the maximum air gap and the minimum air gap, so that the variation rate of the external dimension of the rotor 20 is large, and the requirement on the machining accuracy of the rotor 20 is high. According to the rotor 20 provided by the embodiment, by injecting a third harmonic wave, the processing difficulty of the rotor 20 can also be reduced.

According to the embodiment, optionally, the input winding comprises an excitation winding 104; the output winding comprises a sinusoidal winding 106 and a cosinoidal winding 108, wherein two of the stator teeth are arranged between any adjacent two of the excitation windings 104 at intervals to respectively wind the sinusoidal winding 106 and the cosinoidal winding 108.

According to the embodiment, two of the stator teeth are arranged between any adjacent two of the excitation windings at intervals to respectively wind a sinusoidal winding 106 and a cosinoidal winding, so that the excitation winding 104, the sinusoidal winding 106 and the cosinoidal winding 108 are distributed at intervals along the circumferential direction, the stator is excited by combining the excitation winding 104, and the sinusoidal winding 106 and the cosinoidal winding 108 output variation signals which form a special functional relationship with the mechanical rotation angle $\theta$ of the rotor, and the measurement accuracy of the position of the rotary transformer 1 is improved when the third harmonic wave is injected into the air gap.

For example, the stator teeth include a first stator tooth for winding an excitation winding 104, a second stator tooth for winding a sinusoidal winding 106 and a third stator tooth for winding a cosinoidal winding 108, wherein the second stator tooth and the third stator tooth are arranged between any adjacent two of the first stator teeth.

According to any of the above embodiments, optionally, a sinusoidal winding 106 is wound on two sides of any one of adjacent two of the excitation windings 104, and a cosinoidal winding 108 is wound on two sides of the other excitation winding 104.

According to the embodiment, with different windings wound, a plurality of circumferentially distributed stator teeth can be divided into a first stator tooth, a second stator tooth and a third stator tooth, and the number of the first stator tooth, the number of the second stator tooth and the number of the third stator tooth are the same, so that an excitation winding 104 for signal input and a sinusoidal winding 106 and a cosinoidal winding 108 for signal output are wound respectively, wherein adjacent first stator teeth, second stator teeth and third stator teeth are a group of winding teeth, and a plurality of circumferentially distributed stator teeth are composed of a plurality of groups of winding teeth, so that a regular winding of the magneto-resistive rotary transformer is realized to achieve the purpose of improving measurement accuracy in combination with injection of a third sinusoidal component.

For example, as shown in FIG. 3, the input winding and the output winding can be divided into a plurality of winding units which are connected end to end in the circumferential direction to complete winding, and in one winding unit, the winding unit sequentially comprises an excitation winding 104, a sinusoidal winding 106, a cosinoidal winding 108, an excitation winding 104, a cosinoidal winding 108 and a sinusoidal winding 106 in the counterclockwise direction or comprises an excitation winding 104, a cosinoidal winding 108, a sinusoidal winding 106, an excitation winding 104, a sinusoidal winding 106 and a cosinoidal winding 108 in the counterclockwise direction.

According to any of the above embodiments, optionally, the length $\delta$ of the air gap satisfies both the first sinusoidal component distribution and the third sinusoidal component distribution of the mechanical rotation angle $\theta$ of the rotor, i.e. $\delta = f(\cos(p\theta), \cos(3p\theta))$, where p is the number of pairs of poles of the rotor 20 of the rotary transformer 1, and $\theta$ is the mechanical rotation angle of the rotor 20.

According to the embodiment, a first sinusoidal component distribution and a third sinusoidal component distribution of the mechanical rotation angle $\theta$ are simultaneously satisfied by defining a length $\delta$ of the air gap, i.e. $\delta = f(\cos(p\theta), \cos(3p\theta))$. When an output potential of a sinusoidal winding 106 of the rotary transformer 1 is equal to an amplitude value of a first fundamental wave of an output potential of a cosinoidal winding 108, detection accuracy of the position of the rotor 20 is improved by injecting the third sinusoidal component of the length of the air gap.

According to any of the above embodiments, optionally, the number of coil turns of the excitation winding 104 on each first stator tooth is the same; the number of coil turns of a sinusoidal winding 106 is the same as that of a cosinoidal winding 108.

According to the embodiment, the number of coil turns of the excitation winding 104 on each first stator tooth is limited to be the same to generate the stator 10 excitation evenly, so as to rotate the rotor 20 evenly; the number of coil turns of the sinusoidal winding 106 and the number of coil turns of the cosinoidal winding 108 are limited to be the same, so that the output potential of the sinusoidal winding 106 and the output potential of the cosinoidal winding 108 are only different in phase, and the accurate measurement of the rotating shaft angular displacement and the angular velocity of the rotating shaft is guaranteed.

According to any of the above embodiments, optionally, the length δ of the air gap and the mechanical angle θ of the rotor 20 also satisfy the following equation:

$$\delta = \frac{K\delta_{min}}{1 + (K-1)\cos(p\theta) - k\cos(3p\theta)}$$

wherein $\delta_{min}$ is the minimum length of the air gap, K is a first sinusoidal component coefficient, and k is a third sinusoidal component coefficient, 1<K<2, 0<k<(K−1).

According to the embodiment, the length of the air gap is changed with the change of the mechanical angle by defining a specific relationship formula, and the profile of the rotor 20 injected with the third sinusoidal component is obtained by adjusting the first sinusoidal component coefficient K and the third sinusoidal component coefficient k, so as to improve the measurement accuracy of the rotation angle.

According to any of the above embodiments, optionally, $\delta_{min}$=0.72 mm, K=1.9, k=0.09, and p=2.

According to the embodiment, an explicit functional relationship between the length δ of the air gap and the mechanical angle θ of the rotor 20 is obtained by defining=0.72 mm, K=1.9, k=0.09, and p=2 to facilitate implementation.

As a particular embodiment, P=2, the number of the stator teeth is 24, i.e. a salient pole rotary transformer with 4 poles and 24 slots, wherein an excitation winding 104, a sinusoidal winding 106 and a cosinoidal winding 108 are respectively and sequentially arranged on three adjacent teeth, coils of the three teeth are arranged in an array of 8 along the circumference, each having 25 coil turns; a wire diameter φ1 is 0.1 mm, the sinusoidal winding 106 and the cosinoidal winding 108 each has 55 coil turns, the wire diameter φ2 is 0.13 mm, silicon steel sheets of DW310-35 are selected as punching sheets of the rotary transformer.

As shown in FIG. 1, according to a solution setup in the prior art, the maximum profile size of the rotor core is 98.56 mm, the minimum profile gear is 72.64 mm, the length of the maximum air gap $\delta_{max}$=13.68 mm, the minimum length of the air gap $\delta_{min}$=0.72 mm, and the electrical angle error of the rotor 20 after the rotary transformer is decoded is e1=±1.05°.

According to the rotor profile of the present disclosure, the maximum profile size of the rotor core is 98.48 mm, the minimum profile gear is 85.6 mm, the length of the maximum air gap of the rotary transformer $\delta_{max}$=7.2 mm, the minimum length of the air gap $\delta_{min}$=0.76 mm, and the electrical angle error of the rotor 20 after the rotary transformer is decoded is e1=±0.04°, i.e. the electrical angle error of the rotor 20 decoded by the salient pole rotary transformer with the shape of the rotor 20 injected with the third sinusoidal component is 3.81% of the electrical angle error of the rotor 20 decoded by the salient pole rotary transformer with the shape of the sinusoidal wave rotor 20 in the prior art, so that the error of the rotor 20 is reduced.

As shown in FIG. 1 is a rotor profile of a salient pole rotary transformer in which the length of an air gap is sinusoidally distributed along the circumference in the prior art, wherein the stator inner diameter φ1=0.01 mm, the minimum air gap length is $\delta_{min}$=0.72 mm, and the formula of the air gap length along the circumference is as follows:

$$\delta 1 = \frac{K\delta_{min}}{1 + (K-1)\cos(p\theta)}$$

wherein 1<K<2; in the embodiment, K=1.9;
p: the number of pairs of poles of the salient pole rotor; in the embodiment, p=2, i.e. the salient pole rotor comprises 2 pairs of magnetic poles;
θ: the mechanical rotation angle at which the length of the air gap rotates circumferentially.

FIG. 2 shows the rotor profile of a salient-pole rotary transformer injected with a third sinusoidal component, the length of the air gap being expressed in the circumferential direction as follows:

$$\delta 2 = \frac{K\delta_{min}}{1 + (K-1)\cos(p\theta) - k\cos(3p\theta)}$$

wherein 0<k<(K−1), k is a positive number greater than 0, in the embodiment, k=0.09.

TABLE 1

| θ(°) | δ1(mm) Prior art | δ2(mm) Examples of the present disclosure |
|---|---|---|
| 0 | 0.720 | 0.756 |
| 15 | 0.769 | 0.769 |
| 30 | 0.943 | 0.888 |
| 45 | 1.368 | 1.368 |
| 60 | 2.487 | 2.974 |
| 75 | 6.202 | 6.202 |
| 90 | 13.680 | 7.200 |
| 105 | 6.202 | 6.202 |
| 120 | 2.487 | 2.974 |
| 135 | 1.368 | 1.368 |
| 150 | 0.943 | 0.888 |
| 165 | 0.769 | 0.769 |
| 180 | 0.720 | 0.756 |
| 195 | 0.769 | 0.769 |
| 210 | 0.943 | 0.888 |
| 225 | 1.368 | 1.368 |
| 240 | 2.487 | 2.974 |
| 255 | 6.202 | 6.202 |
| 270 | 13.680 | 7.200 |
| 285 | 6.202 | 6.202 |
| 300 | 2.487 | 2.974 |
| 315 | 1.368 | 1.368 |
| 330 | 0.943 | 0.888 |
| 345 | 0.769 | 0.769 |
| 360 | 0.720 | 0.756 |

As can be seen from Table 1, in the case where the size of the stator 10 is the same as that in the prior art, the difference between the maximum air gap length and the minimum air gap length is reduced, the output potential of the sinusoidal winding 106 of the rotary transformer 1 is equal to the primary fundamental amplitude value of the output potential of the cosinoidal winding 108, but the detection accuracy of the position of the rotor 20 is improved.

In addition, by adjusting an inner diameter of the stator core 102, the difference between the maximum air gap length and the minimum air gap length can be made the same as that in the prior art, the output potential amplitude can be improved without increasing the number of coil turns of the output winding, and the detection accuracy of the position of the rotor 20 is improved.

According to any of the above embodiments, the rotor core is optionally constructed in a salient pole configuration according to the number of pairs of poles of the rotor 20, so that the length δ of the air gap varies with the mechanical rotation angle θ in the circumferential direction.

According to any of the above embodiments, optionally, a limiting groove is formed in the inner side wall of the shaft hole of the rotor core; and a limiting rib matched with the limiting groove is arranged on the outer side wall of the rotating shaft.

According to any of the above embodiments, optionally, the number of the stator teeth is an integer multiple of 12.

According to any of the above embodiments, optionally, the stator core 102 is formed of a plurality of silicon steel sheets stacked in the axial direction of the rotating shaft; the rotor core is formed by stacking a plurality of silicon steel sheets along the axial direction of the rotating shaft. Two end faces of the rotor core protrude axially from two end faces of the stator core 102.

According to an embodiment of the present disclosure, the rotary transformer is a magneto-resistive rotary transformer, an excitation winding and an output winding (including sinusoidal windings and cosinoidal windings) are wound on stator teeth of a stator core according to a specified way of winding, so that the stator is excited through the excitation winding, so that variation signals which form a special functional relationship with the mechanical rotation angle θ of the rotor are output by the sinusoidal windings and cosinoidal windings, the length δ of the air gap, along the circumferential direction, and a mechanical rotation angle θ of the rotor are set to satisfy a sinusoidal function relationship containing third-harmonic components so as to inject a third harmonic into the air gap of the rotary transformer so as to weaken the third harmonic of the output potential of the output end, so that the measurement error of the magneto-resistive rotary transformer can be reduced, and the measurement accuracy of the position of the rotary transformer can be improved.

According to the present disclosure, the terms "first", "second", "third" are used for descriptive purposes only and are not to be construed as indicating or implying relative importance; the term "plurality" refers to two or more, unless explicitly defined otherwise. The terms "mount", "connected", "connect", "fix", and the like are to be construed broadly, e.g., "connect" may be a fixed connection, a removable connection, or an integral connection; "connected" may be directly connected or indirectly connected through an intermediary. A specific meaning of the above terms according to the present disclosure will be understood by a person skilled in the art, as the case may be.

According to the description of the present disclosure, it is to be understood that the terms "upper", "lower", "left", "right", "front", "back", and the like indicate orientations or positional relationships that are based on the orientations or positional relationships shown in the drawings and are merely intended to facilitate the description of the present disclosure and to simplify the description and are not intended to indicate or imply that a particular orientation of the referenced device or element is required, constructed and operated in particular orientations, thus is not to be construed as limiting the present disclosure.

According to the description of the present description, the description of the terms "one embodiment", "some embodiments", "particular embodiments", etc., means that a particular feature, structure, material, or characteristic described in connection with the embodiment or example is included in at least one embodiment or example of the present disclosure. In the description, schematic representations of the above terms do not necessarily refer to the same embodiment or example. Furthermore, the particular features, structures, materials, or characteristics described may be combined in any suitable manner in any one or more embodiments or examples.

The foregoing is merely an exemplary embodiment of the present disclosure and is not intended to limit the present disclosure, as various modifications and changes therein will occur to a person skilled in the art. Any modifications, equivalents, improvements, etc. that come within the spirit and principles of the present disclosure are intended to be included within the scope of the present disclosure.

What is claimed is:

1. A rotary transformer comprising:
a stator comprising:
   a stator core,
   an input winding and an output winding, being configured to be wound around the stator core,
   a plurality of stator slots provided in an inner side wall of the stator core, wherein the plurality of stator slots are distributed in a circumferential direction of the stator and configured to communicate two ends of the stator core respectively, and
   stator teeth formed between any adjacent two of the stator slots, for respectively winding the input winding and the output winding; and
a rotor comprising a rotor core sleeved in the stator core, wherein:
an air gap is defined between the inner side wall of the stator core and an outer side wall of the rotor core, and
during rotation of the rotor, a length δ of the air gap in the circumferential direction and a mechanical rotation angle θ of the rotor satisfy a sinusoidal function relationship containing third-harmonic components, and the length δ changes periodically according to the functional relationship to define a shape of the rotor core,
wherein:
the length δ of the air gap satisfies both a first sinusoidal component distribution and a third sinusoidal component distribution of the mechanical rotation angle θ of the rotor, and the length δ and the mechanical rotation angle θ satisfy δ=f(cos(pθ), cos(3pθ)), wherein p is the number of pairs of poles of the rotor; and
the length δ of the air gap and the mechanical rotation angle θ of the rotor further satisfy the following equation:

$$\delta = \frac{K\delta_{min}}{1+(K-1)\cos(p\theta)-k\cos(3p\theta)},$$

wherein $\delta_{min}$ is the minimum length of the air gap, K is a first sinusoidal component coefficient, and k is a third sinusoidal component coefficient, 1<K<2, 0<k<(K-1).

2. The rotary transformer according to claim 1, wherein:
the input winding comprises excitation windings, and
the output winding comprises sinusoidal windings and cosinoidal windings,
wherein two of the stator teeth are arranged between any adjacent two of the excitation windings at intervals, so as to respectively wind the sinusoidal windings and the cosinoidal windings.

3. The rotary transformer according to claim 2, wherein:
the sinusoidal windings are wound on two sides of one of any adjacent two of the excitation windings, and the cosinoidal windings are wound on two sides of the other excitation winding.

4. The rotary transformer according to claim 1, wherein:
$\delta_{min}$=0.72 mm, K=1.9, k=0.09, and p=2.

5. The rotary transformer according to claim 1, wherein:
the number of coil turns of the excitation winding on each stator tooth is the same; and
the number of coil turns of the sinusoidal winding is the same as that of the cosinoidal winding.

6. The rotary transformer according to claim 1, wherein:
a limiting groove is provided in an inner side wall of a shaft hole of the rotor core.

7. The rotary transformer according claim 1, wherein:
the number of the stator teeth is an integer multiple of 12.

8. The rotary transformer according to claim 1, wherein:
the stator core comprises an axial superposition structure of a plurality of silicon steel sheets along a rotating shaft of the rotor core, and
the rotor core comprises an axial superposition structure of a plurality of silicon steel sheets along a rotating shaft of the rotor core.

* * * * *